United States Patent
Endo

(10) Patent No.: US 12,450,956 B2
(45) Date of Patent: Oct. 21, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Aichi-ken (JP)

(72) Inventor: Masato Endo, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 304 days.

(21) Appl. No.: 18/193,638

(22) Filed: Mar. 31, 2023

(65) Prior Publication Data

US 2023/0401905 A1   Dec. 14, 2023

(30) Foreign Application Priority Data

Jun. 10, 2022   (JP) .................. 2022-094588

(51) Int. Cl.
G07C 5/02   (2006.01)
B60W 50/06   (2006.01)
B60W 50/14   (2020.01)

(52) U.S. Cl.
CPC .............. *G07C 5/02* (2013.01); *B60W 50/06* (2013.01); *B60W 50/14* (2013.01)

(58) Field of Classification Search
CPC ......... G07C 5/02; B60W 50/06; B60W 50/14; B60W 2050/146; B60W 40/09
See application file for complete search history.

(56) References Cited

U.S. PATENT DOCUMENTS

2020/0365018 A1* 11/2020 Arai .................. H04Q 9/00

FOREIGN PATENT DOCUMENTS

JP   2003-81040 A   3/2003
JP   2022-026230 A   2/2022

* cited by examiner

*Primary Examiner* — Yuen Wong
(74) *Attorney, Agent, or Firm* — HAUPTMAN HAM, LLP

(57) ABSTRACT

An information processing device includes: an acquisition unit for acquiring vehicle information related to a vehicle; an evaluation unit for performing evaluation related to driving of a driver of the vehicle for an evaluation item including a specific item related to a function that assists driving and that is executable by a specific vehicle different from the vehicle, based on the vehicle information acquired by the acquisition unit; and a notification unit for notifying the driver of an evaluation result of the specific item of the driver by the evaluation unit.

8 Claims, 9 Drawing Sheets

```
< COMPREHENSIVE EVALUATION >

GENERAL ITEM A: 4/5 POINTS
81  GENERAL ITEM B: 3/5 POINTS
         .
         .
         .
    SPECIFIC ITEM A: 4/5 POINTS
    SPECIFIC ITEM B: 2/5 POINTS
         .
         .
         .
                          82  [ NEXT ]
    TOTAL: 75 POINTS/100 POINTS   83  [ END ]
```

46

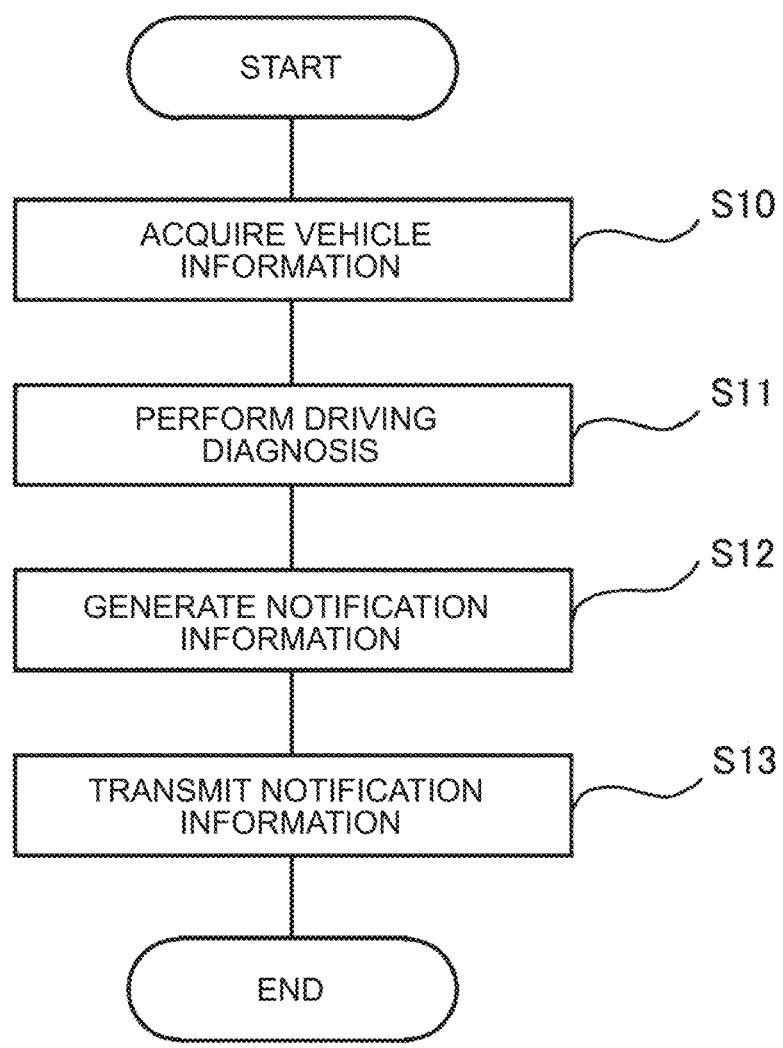

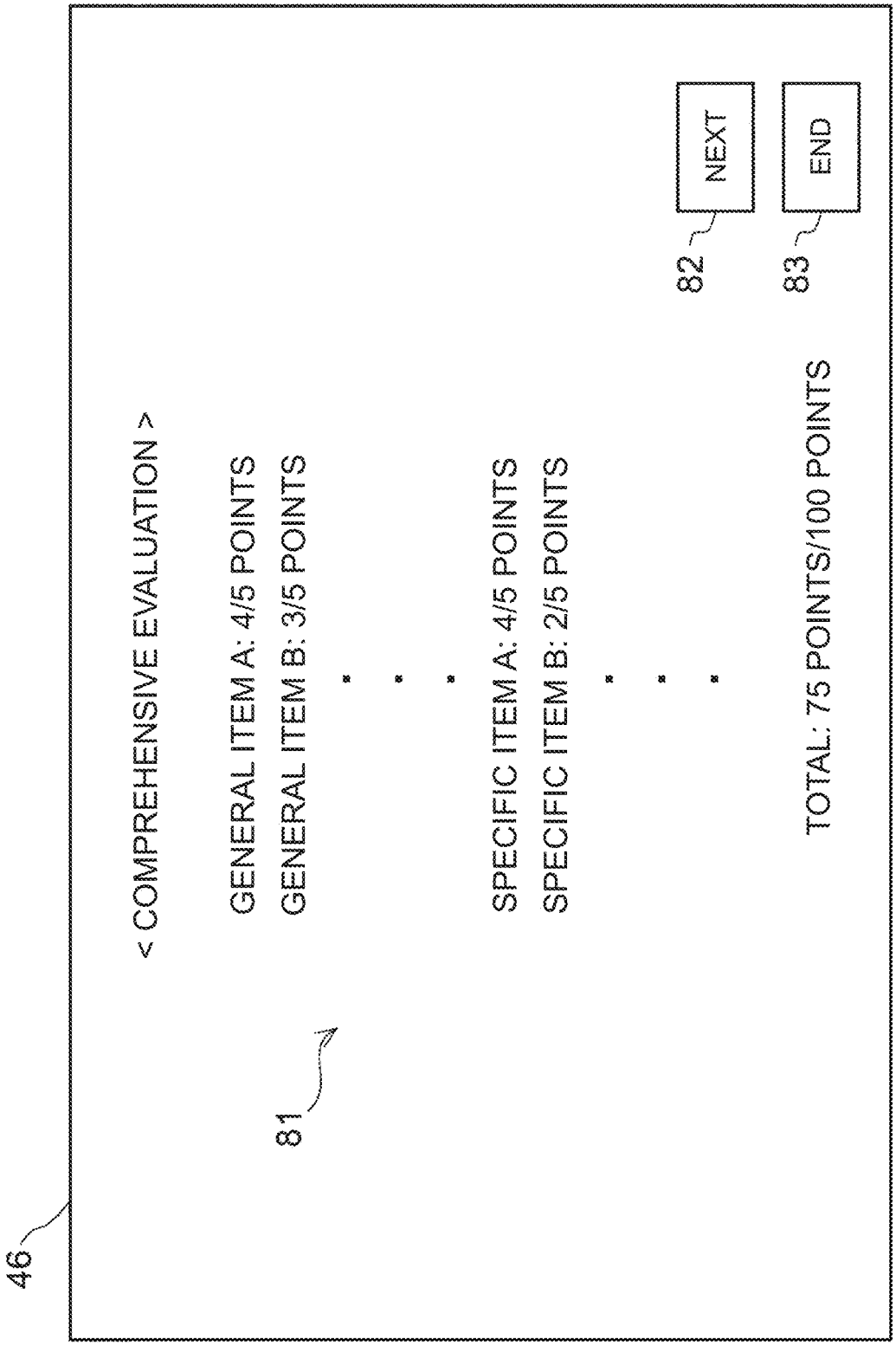

FIG. 8

< INDIVIDUAL EVALUATION >

81 — THIS TIME, SPECIFIC ITEM B WAS 3 POINTS OR LOWER.

SUDDEN START SUPPRESSION DEVICE FOR PEDAL MISAPPLICATION WOULD HAVE BEEN EXECUTED IN PARKING LOT OF ABC SUPERMARKET IF SUPPORT CAR HAD BEEN DRIVEN.

FINALLY, THE NUMBER OF TIMES ADVANCED SAFETY TECHNOLOGY WOULD HAVE BEEN EXECUTED PER WEEK IF SUPPORT CAR HAD BEEN DRIVEN IS "5 TIMES".

82 — NEXT

83 — END

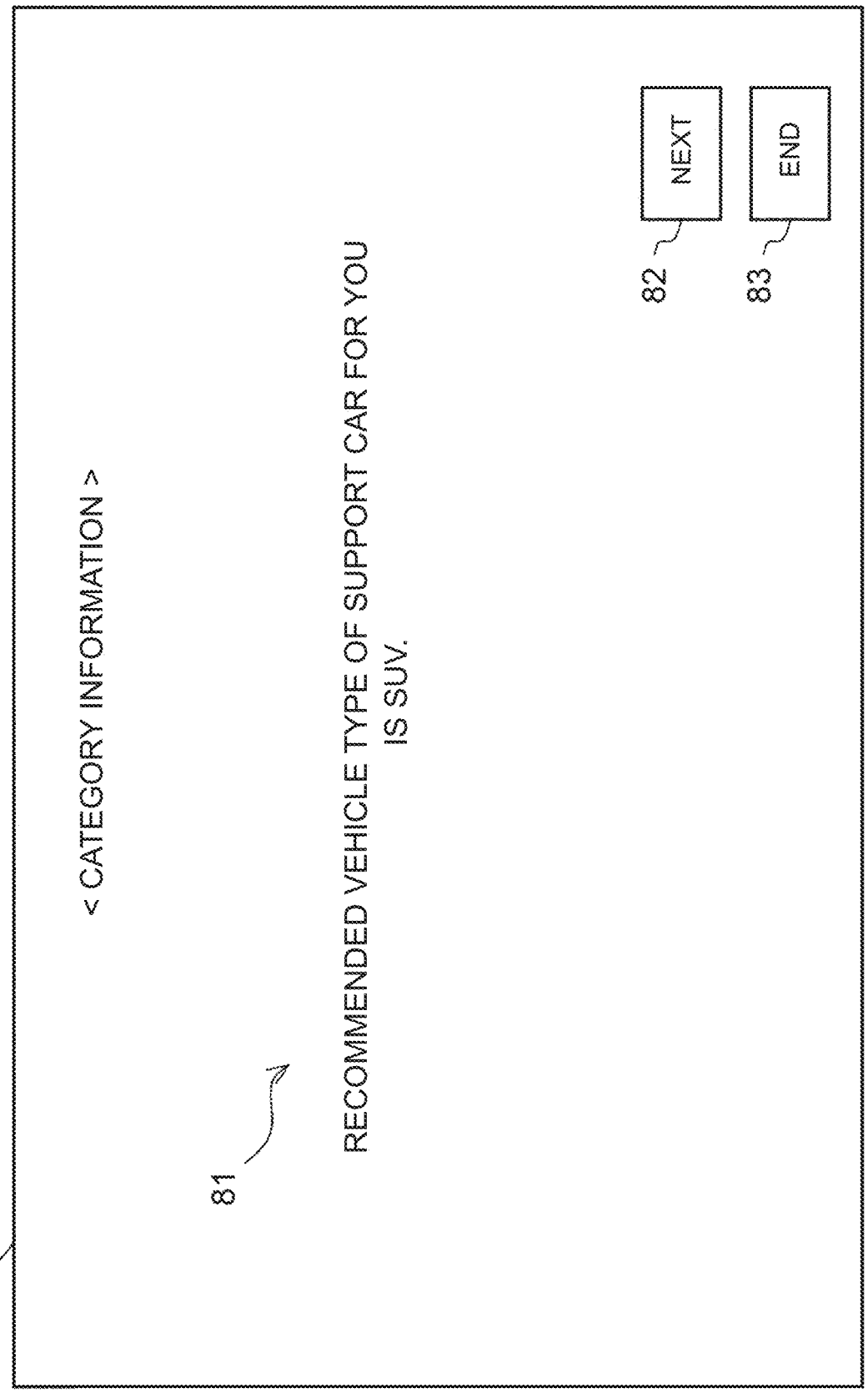

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-094588 filed on Jun. 10, 2022, incorporated herein by reference in its entirety.

BACKGROUND

1. Technical Field

The present disclosure relates to an information processing device, an information processing method, and a storage medium.

2. Description of Related Art

Japanese Unexamined Patent Application Publication No. 2003-081040 (JP 2003-081040 A) discloses a driving assistance device capable of diagnosing the driving skill level of a driver who drives means of transportation such as an automobile or a motorcycle, and using the diagnosis result to assist the driving of the driver.

SUMMARY

The technique disclosed in JP 2003-081040 A can present the diagnosis result to the driver. However, it is difficult for the driver to determine whether it is better to drive a specific vehicle capable of executing a function that assists driving even when reviewing the diagnosis result.

Therefore, an object of the present disclosure is to provide an information processing device, an information processing method, and a storage medium that can provide a driver with determination material on whether it is better to drive a specific vehicle capable of executing a function that assists driving.

An information processing device includes: an acquisition unit for acquiring vehicle information related to a vehicle; an evaluation unit for performing evaluation related to driving of a driver of the vehicle for an evaluation item including a specific item related to a function that assists driving and that is executable by a specific vehicle different from the vehicle, based on the vehicle information acquired by the acquisition unit; and a notification unit for notifying the driver of an evaluation result of the specific item of the driver by the evaluation unit.

In the information processing device, the acquisition unit acquires the vehicle information. The evaluation unit performs evaluation related to driving of the specific driver based on the vehicle information acquired by the acquisition unit and the evaluation item including the specific item. The notification unit notifies the driver of the evaluation result of the specific item of the driver by the evaluation unit. As a result, the information processing device notifies the driver of the evaluation result of the specific item related to the function for assisting driving that can be executed by the specific vehicle, making it possible to provide the driver with determination material on whether it is better to drive the specific vehicle.

In the information processing device, the notification unit notifies the driver that the function would have been executed if the specific vehicle had been driven, when the acquisition unit acquires specific information that is specific vehicle information.

In the information processing device, the notification unit notifies the driver that the function for assisting driving would have been executed if the specific vehicle had been driven, when the acquisition unit acquires the specific information. As a result, the information processing device notifies the driver that the function for assisting driving would have been executed if the specific vehicle had been driven, thereby making it easier for the driver to determine whether it is better to drive the specific vehicle.

In the information processing device, the notification unit notifies the driver of the number of times the function would have been executed if the specific vehicle had been driven, based on the specific information acquired by the acquisition unit.

In the information processing device, the notification unit notifies the driver of the number of times the function for assisting driving would have been executed if the specific vehicle had been driven, based on the specific information acquired by the acquisition unit. As a result, the information processing device notifies the driver of the number of times the function for assisting driving would have been executed if the specific vehicle had been driven, thereby making it easier for the driver to determine whether it is better to drive the specific vehicle.

In the information processing device, the notification unit notifies the driver after the vehicle is driven.

In the information processing device, the notification unit notifies the driver after the vehicle is driven. As a result, the information processing device notifies the driver after the vehicle is driven, so that the driver can carefully consider the notification content.

In the information processing device, the notification unit notifies the driver of position information indicating a position where the function would have been executed if the specific vehicle had been driven, when the acquisition unit acquires the specific information that is specific vehicle information.

In the information processing device, the notification unit notifies the driver of the position information indicating the position where the function for assisting driving would have been executed if the specific vehicle had been driven, when the acquisition unit acquires the specific information. As a result, the information processing device notifies the driver of the position information indicating the position where the function for assisting driving would have been executed if the specific vehicle had been driven, thereby allowing the driver to grasp the position where the function would have been executed.

In the information processing device, the notification unit notifies the driver of category information indicating a category of the specific vehicle that is appropriate for the driver, based on the evaluation result of driving of the driver by the evaluation unit.

In the information processing device, the notification unit notifies the driver of category information indicating a category of the specific vehicle that is appropriate for the driver, based on the evaluation result of driving of the driver by the evaluation unit. As a result, the information processing device notifies the driver of the category information indicating the category of the specific vehicle that is suitable for the driver, thereby allowing the driver to grasp the category of the specific vehicle that is suitable for him/herself.

In the information processing device, the notification unit notifies the driver while the vehicle is being driven.

In the information processing device, the notification unit notifies the driver while the vehicle is being driven. As a result, in the information processing device, the notification to the driver is executed while the vehicle is being driven, thereby allowing the driver to easily grasp whether it is better to drive the specific vehicle while driving the vehicle.

In an information processing method, a computer executes processes including: acquiring vehicle information related to a vehicle; performing evaluation related to driving of a driver of the vehicle for an evaluation item including a specific item related to a function that assists driving and that is executable by a specific vehicle different from the vehicle, based on the acquired vehicle information; and notifying the driver of an evaluation result of the specific item of the driver.

In a storage medium, an information processing program causes a computer to execute processes including: acquiring vehicle information related to a vehicle; performing evaluation related to driving of a driver of the vehicle for an evaluation item including a specific item related to a function that assists driving and that is executable by a specific vehicle different from the vehicle, based on the acquired vehicle information; and notifying the driver of an evaluation result of the specific item of the driver.

The information processing device may adopt another aspect described below.

As another aspect, in the information processing device, the notification unit notifies the driver after the vehicle is driven.

As another aspect, in the information processing device, the notification unit notifies the driver of position information indicating a position where the function would have been executed if the specific vehicle had been driven, when the acquisition unit acquires the specific information that is specific vehicle information.

As another aspect, in the information processing device, the notification unit notifies the driver of category information indicating a category of the specific vehicle that is appropriate for the driver, based on the evaluation result of driving of the driver by the evaluation unit.

As another aspect, in the information processing device, the notification unit notifies the driver while the vehicle is being driven.

As described above, the information processing device, the information processing method, and the storage medium according to the present disclosure can provide a driver with determination material on whether it is better to drive a specific vehicle capable of executing a function that assists safe driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart showing a flow of a notification process executed by the management server according to the present embodiment;

FIG. 7 is a first display example displayed on a display unit of the driver terminal according to the present embodiment;

FIG. 8 is a second display example displayed on the display unit of the driver terminal according to the present embodiment;

FIG. 9 is a third display example displayed on the display unit of the driver terminal according to the present embodiment;

DETAILED DESCRIPTION OF EMBODIMENTS

Hereinafter, an information processing system 10 according to the present embodiment will be described.

The information processing system 10 according to the present embodiment is a system that provides a driver with determination material on whether it is better to drive a safety support car (hereinafter referred to as "support car") capable of executing a function for supporting safe driving (hereinafter referred to as "advanced safety technology").

The support car is a vehicle that supports the driver's safe driving with advanced safety technology. The advanced safety technology includes, for example, a collision damage mitigation brake device, a sudden start suppression device for pedal misapplication, and a lane departure warning device. The support car is an example of a "specific vehicle".

The collision damage mitigation brake device is an advanced safety technology that detects vehicles or pedestrians ahead of the vehicle using onboard radar, cameras, or the like, and warns the driver when there is a possibility of a collision. The collision damage mitigation brake device is an advanced safety technology that automatically activates the brakes when there is a high possibility of a collision.

The sudden start suppression device for pedal misapplication is an advanced safety technology that suppresses sudden acceleration by reducing engine output or the like when the accelerator is depressed in a state where the on-vehicle radar, camera, sonar, or the like detects a wall or a vehicle in at least one of the front and rear while the vehicle is stopped or traveling at low speed.

The lane departure warning device is an advanced safety technology that uses an in-vehicle camera to detect lane markings on the road and warns the driver when the vehicle is about to stray from the lane or when the vehicle has strayed from the lane.

First Embodiment

First, a first embodiment of the information processing system 10 according to the present embodiment will be described.

Figure 1:
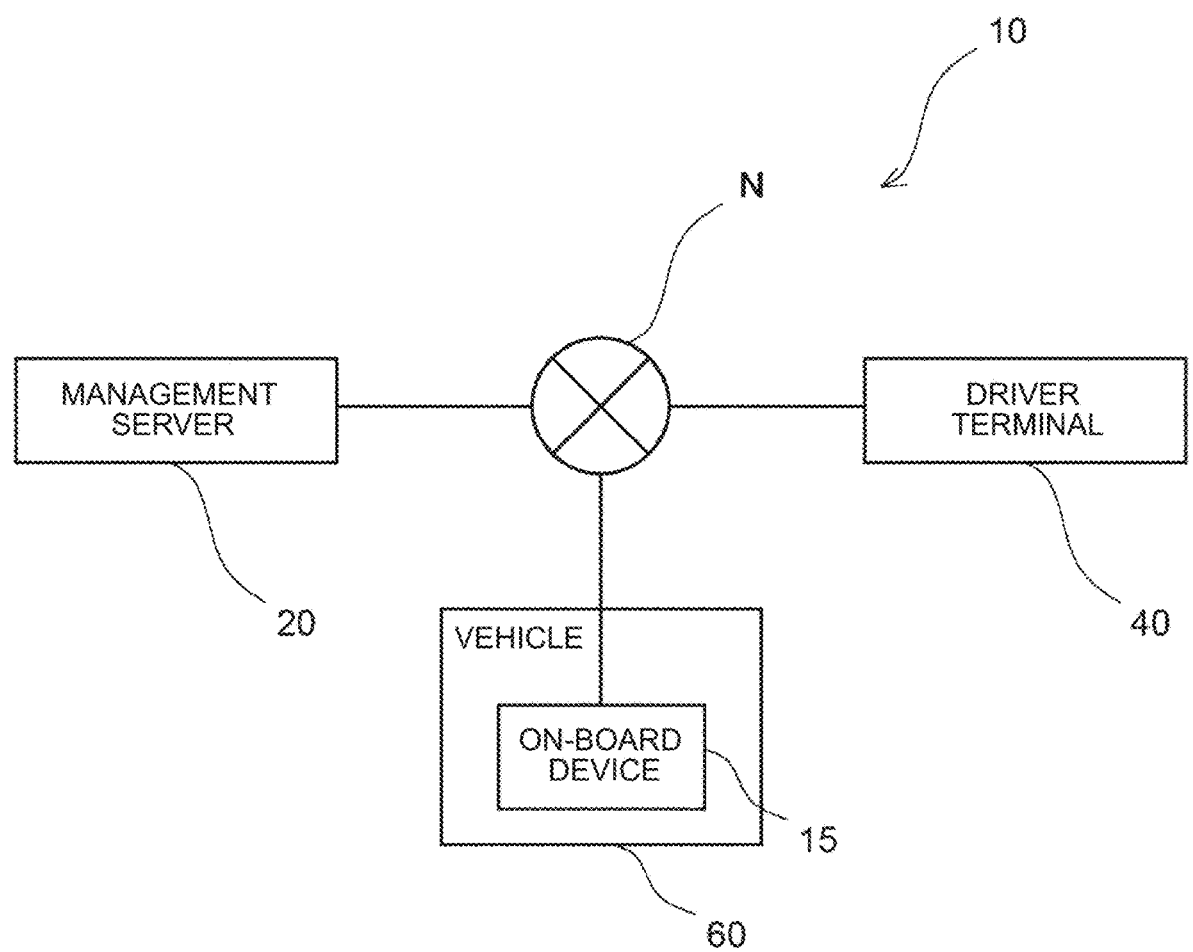
FIG. 1 is a diagram showing a schematic configuration of an information processing system according to the present embodiment.

FIG. 1 is a diagram showing a schematic configuration of the information processing system 10.

As shown in FIG. 1, the information processing system 10 includes a management server 20, a driver terminal 40, and a vehicle 60. The management server 20, the driver terminal 40, and an on-board device 15 mounted on the vehicle 60 are connected via a network N, and are able to communicate with each other.

The management server 20 is a server computer owned by a predetermined business operator. The management server 20 is an example of an "information processing device".

The driver terminal 40 is a mobile terminal owned by a driver of the vehicle 60. As an example, a portable personal computer (laptop PC), a smartphone, a tablet terminal, or the like is applied to the driver terminal 40. In the first embodiment, as an example, the driver terminal 40 is a smartphone.

The vehicle 60 may be an engine vehicle, a hybrid electric vehicle, or a battery electric vehicle. However, in the first embodiment, the vehicle 60 is an engine vehicle as an example. The vehicle 60 is an automobile that is not equipped with advanced safety technology. That is, in the first embodiment, the vehicle 60 is not a support car. However, the vehicle 60 is equipped with configurations such as radar, cameras, or sonar that are used by the support car to execute advanced safety technology.

Figure 2:
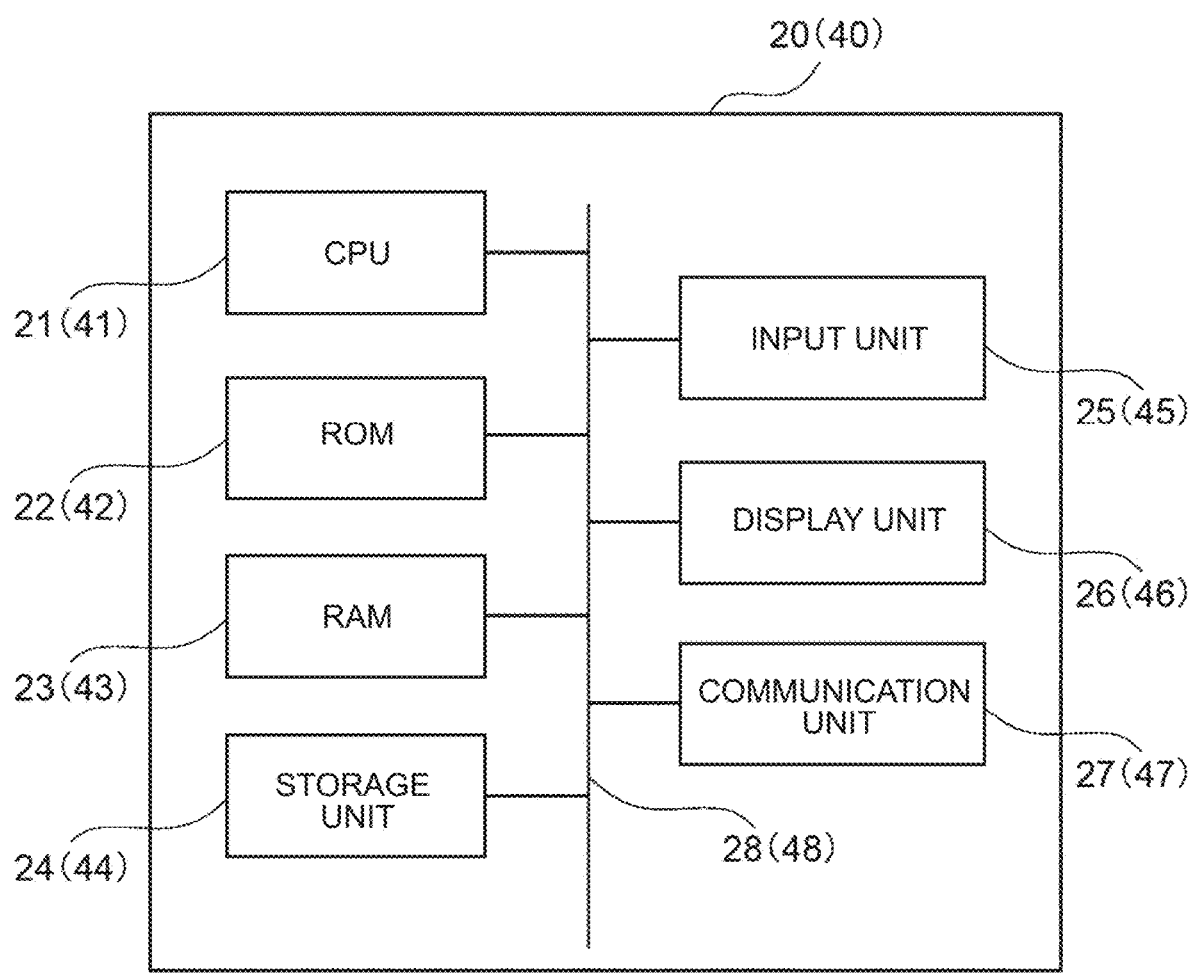
FIG. 2 is a block diagram showing hardware configurations of a management server and a driver terminal according to the present embodiment.

Next, hardware configurations of the management server 20 and the driver terminal 40 will be described. FIG. 2 is a block diagram showing the hardware configurations of the management server 20 and the driver terminal 40. Since the management server 20 and the driver terminal 40 basically have general computer configurations, the management server 20 will be described as a representative.

As shown in FIG. 2, the management server 20 includes a central processing unit (CPU) 21, a read-only memory (ROM) 22, a random access memory (RAM) 23, a storage unit 24, an input unit 25, a display unit 26, and a communication unit 27. The configurations are communicably connected to each other via a bus 28.

The CPU 21 is a central processing unit that executes various programs and that controls various units. That is, the CPU 21 reads the program from the ROM 22 or the storage unit 24 and executes the program using the RAM 23 as a work area. The CPU 21 controls each of the above configurations and performs various arithmetic processes in accordance with the program recorded in the ROM 22 or the storage unit 24. The storage unit 24 is an example of a storage medium.

The ROM 22 stores various programs and various data. The RAM 23 temporarily stores a program or data as a work area.

The storage unit 24 is composed of a storage device such as a hard disk drive (HDD), a solid state drive (SSD), or a flash memory, and stores various programs and various data.

The input unit 25 includes a pointing device such as a mouse, a keyboard, a microphone, a camera, and the like, and is used for performing various inputs.

The display unit 26 is, for example, a liquid crystal display and displays various types of information. A touch panel may be adopted as the display unit 26 and may function as the input unit 25.

The communication unit 27 is an interface for communicating with other devices. For the communication, for example, a wired communication standard such as Ethernet (registered trademark) or FDDI, or a wireless communication standard such as 4G, 5G, Bluetooth (registered trademark), or Wi-Fi (registered trademark) is used.

Figure 3:
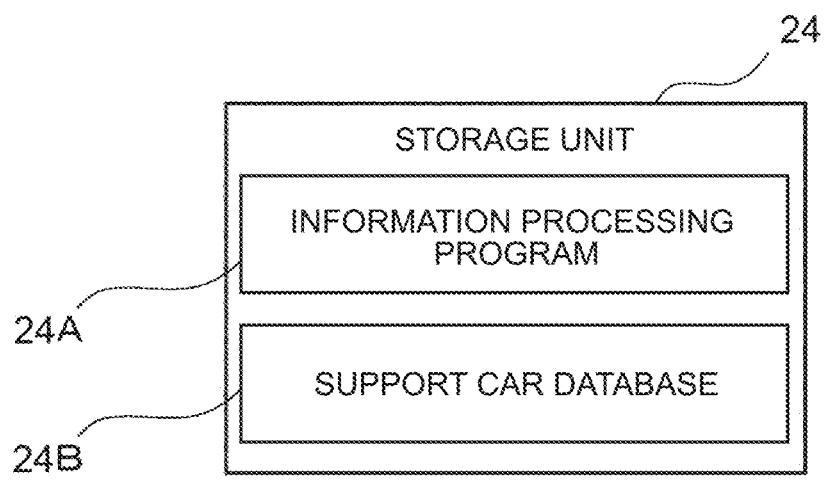
FIG. 3 is a block diagram showing a configuration of a storage unit of the management server according to the present embodiment.

FIG. 3 is a block diagram showing a configuration of the storage unit 24 of the management server 20.

As shown in FIG. 3, the storage unit 24 stores an information processing program 24A and a support car database 24B for causing the CPU 21 of the management server 20 to function as a functional configuration shown in FIG. 4, which will be described later. When executing the information processing program 24A, the management server 20 executes the processes based on the information processing program 24A using hardware resources shown in FIG. 2.

The support car database 24B stores state information indicating the state of the vehicle 60 in which the advanced safety technology is executed if the support car is driven. Specifically, the support car database 24B stores the state information indicating criteria for executing each advanced safety technology such as the collision damage mitigation brake device, the sudden start suppression device for pedal misapplication, and the lane departure warning device.

Next, a functional configuration of the management server 20 will be described.

Figure 4:
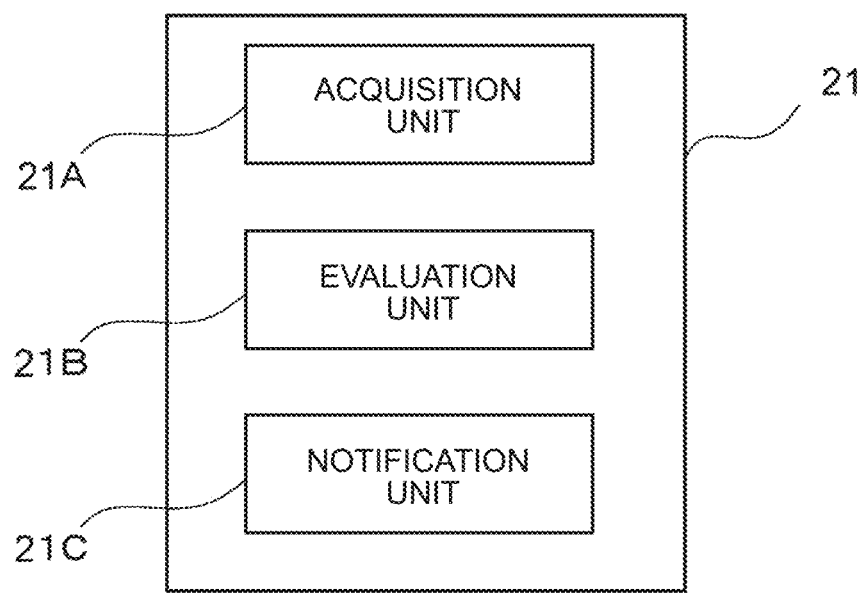
FIG. 4 is a block diagram showing an example of a functional configuration of the management server according to the present embodiment.

FIG. 4 is a block diagram showing an example of the functional configuration of the management server 20.

As shown in FIG. 4, the CPU 21 of the management server 20 has, as functional configurations, an acquisition unit 21A, an evaluation unit 21B, and a notification unit 21C. Each functional configuration is realized when the CPU 21 reads and executes the information processing program 24A stored in the storage unit 24.

The acquisition unit 21A acquires vehicle information regarding the vehicle 60. For example, the acquisition unit 21A acquires, as the vehicle information, a steering angle, an acceleration, a vehicle speed, and a turn signal operation of the vehicle 60 respectively detected by a steering angle sensor 71, an acceleration sensor 72, a vehicle speed sensor 73, and a turn signal switch 74 (to be described later) that are included in the vehicle 60. The acquisition unit 21A also acquires, as the vehicle information, the engine speed, the engine torque, the fuel consumption, and the accelerator operation of the vehicle 60 that are detected by an electronic control unit (ECU) 70C (to be described later) included in the vehicle 60. The acquisition unit 21A also acquires, as the vehicle information, an image captured by a camera 76 (to be described later) included in the vehicle 60. The acquisition unit 21A also acquires, as the vehicle information, the current position of the vehicle 60 that is measured by a global positioning system (GPS) device 80 (to be described later) included in the vehicle 60. The above information is part of the vehicle information that can be acquired by the acquisition unit 21A from the vehicle 60, and the acquisition unit 21A can also acquire information regarding the vehicle 60 other than the above information from the vehicle 60 as the vehicle information.

Based on the vehicle information acquired by the acquisition unit 21A and a plurality of evaluation items, the evaluation unit 21B evaluates the driving of the driver of the vehicle 60 (hereinafter referred to as "driving diagnosis"). In the first embodiment, the plurality of evaluation items includes, for example, a specific item and a general item. The specific item is an evaluation item related to advanced safety technologies that can be executed by the support car, such as the collision damage mitigation brake device, the sudden start suppression device for pedal misapplication, and the lane departure warning device. The general item is an evaluation item other than the specific item. In the first embodiment, as an example, the driver of the vehicle 60 is a driver of a predetermined age, for example, 75 years old or older, and is a so-called elderly driver.

Here, based on the vehicle information acquired by the acquisition unit 21A, the evaluation unit 21B performs an individual evaluation of each item in the plurality of evaluation items and a total evaluation that is the sum of the individual evaluations, as the result of the driving diagnosis of the driver (hereinafter referred to as "driving diagnosis result"). As an example, the individual evaluation determines how many points out of 5 points and the total evaluation determines how many points out of 100 points.

The notification unit 21C notifies the driver of predetermined notification information. In the first embodiment, the notification unit 21C notifies the driver after the vehicle 60 is driven. For example, based on the fact that the acquisition unit 21A has acquired information that the ignition switch (not shown) of the vehicle 60 has been switched from the ON position to the OFF position as the vehicle information after the vehicle 60 is driven, the notification unit 21C transmits the notification information to the driver terminal 40.

The notification information in the first embodiment includes at least one of diagnosis information indicating the driving diagnosis result, execution information indicating that the advanced safety technology would have been executed if the support car had been driven, number of times information indicating the number of times the advanced safety technology would have been executed if the support car had been driven, position information indicating the position where the advanced safety technology would have been executed if the support car had been driven, and category information indicating the category of the support car that is suitable for the driver.

The notification unit 21C basically generates the diagnosis information indicating the individual evaluation of each item of the evaluation item and the total evaluation as the driving diagnosis result, and transmits the notification information including the generated diagnosis information to the driver terminal 40. However, when the evaluation unit 21B evaluates that the individual evaluation of the specific item of the driver is equal to or lower than a predetermined standard, the notification unit 21C generates, as the driving diagnosis result, the diagnosis information indicating that the individual evaluation of the specific item is equal to or lower than the predetermined standard, in addition to the individual evaluation of each item of the evaluation item and the total evaluation. The diagnosis information generated by the notification unit 21C is stored in the storage unit 24.

Further, under a predetermined condition, the notification unit 21C transmits the notification information including at least one of the execution information, the number of times information, the position information, and the category information to the driver terminal 40 in addition to the diagnosis information.

For example, when the acquisition unit 21A acquires the specific information that is specific vehicle information as a predetermined condition, the notification unit 21C transmits the notification information including the execution information and the position information to the driver terminal 40 in addition to the diagnosis information. First, the notification unit 21C compares the vehicle information acquired by the acquisition unit 21A with the state information stored in the support car database 24B. As a result of the comparison, the notification unit 21C determines that "when the acquisition unit 21A acquires the specific information" corresponds to when it can be determined that the advanced safety technology would have been executed if the support car had been driven. The execution information generated by the notification unit 21C is stored in the storage unit 24 in association with the date and time when it was determined that the advanced safety technology would have been executed if the support car had been driven and the position of the vehicle 60.

Further, the notification unit 21C transmits the notification information including at least one of the number of times information and the category information to the driver terminal 40 in addition to the diagnosis information when a predetermined notification opportunity has arrived as a predetermined condition. The predetermined notification opportunity is determined in accordance with the number of times the notification information is transmitted to the driver terminal 40, such as once every five times and once every 10 times. The notification opportunity may be a common opportunity between the number of times information and the category information, or may be a different opportunity.

When the notification opportunity for the number of times information arrives, the notification unit 21C generates the number of times information indicating the number of times the advanced safety technology would have been executed if the support car had been driven per unit time, for example, for the last week, based on the execution information stored in the storage unit 24. Then, the notification unit 21C transmits the notification information including the generated number of times information to the driver terminal 40.

When the notification opportunity for the category information arrives, the notification unit 21C generates the category information based on the diagnosis information stored in the storage unit 24. The category information includes, for example, the classification of the support car, the vehicle type of the support car such as sedan, minivan, or sport utility vehicle (SUV), the vehicle name indicating the proper noun of the support car, and the like that are suitable for the driver. As the classification of the support car, a plurality of classifications is provided in accordance with the content of the advanced safety technology that can be executed by the support car. Then, the notification unit 21C transmits the notification information including the generated category information to the driver terminal 40.

Figure 5:
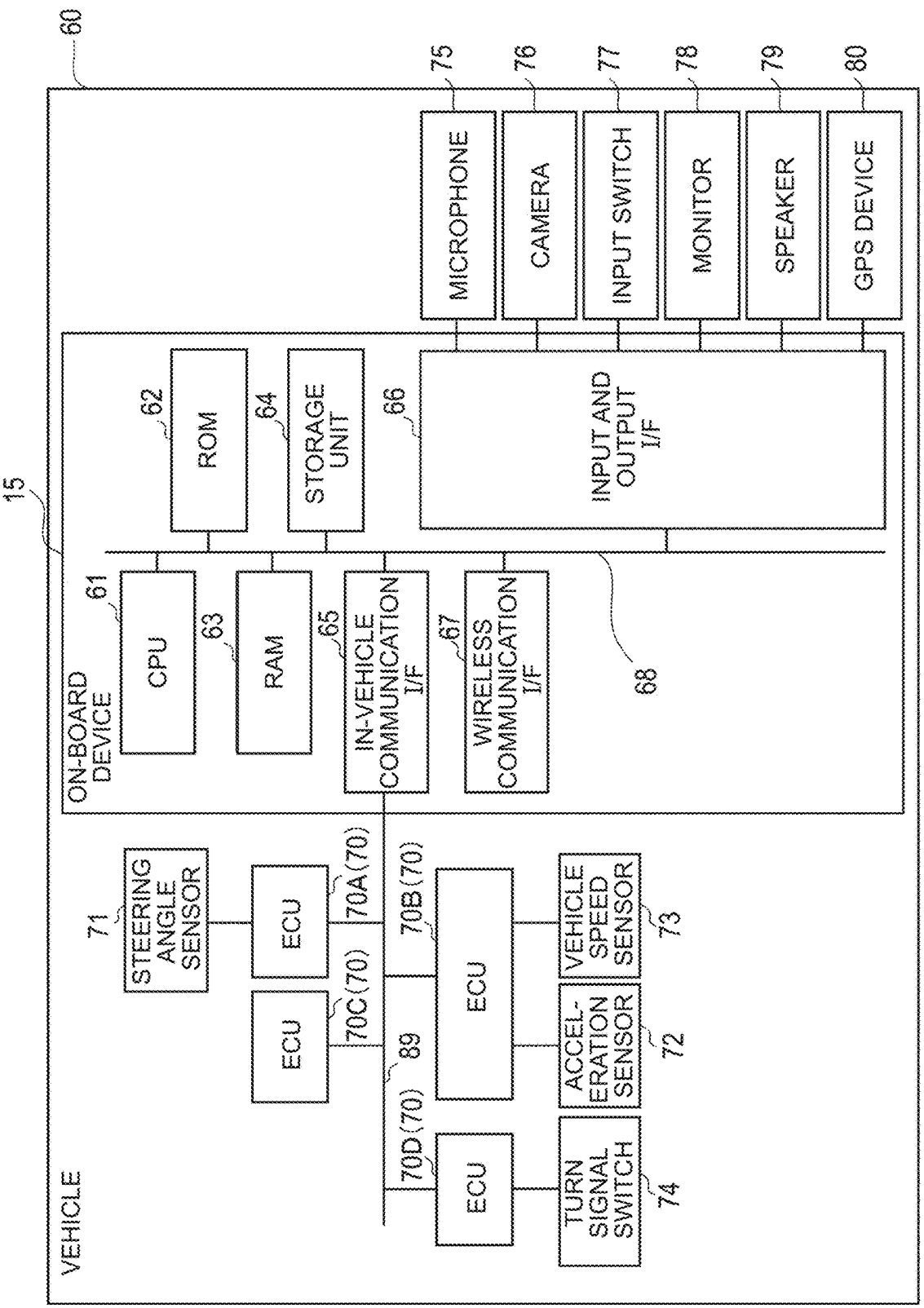
FIG. 5 is a block diagram showing a hardware configuration of a vehicle according to the present embodiment.

Next, the hardware configuration of the vehicle 60 will be described. FIG. 5 is a block diagram showing the hardware configuration of the vehicle 60.

As shown in FIG. 5, the vehicle 60 includes the on-board device 15, a plurality of ECUs 70, the steering angle sensor 71, the acceleration sensor 72, the vehicle speed sensor 73, the turn signal switch 74, a microphone 75, the camera 76, an input switch 77, a monitor 78, a speaker 79, and the GPS device 80.

The on-board device 15 includes a CPU 61, a ROM 62, a RAM 63, a storage unit 64, an in-vehicle communication interface (I/F) 65, an input and output I/F 66, and a wireless communication I/F 67. The CPU 61, the ROM 62, the RAM 63, the storage unit 64, the in-vehicle communication I/F 65, the input and output I/F 66, and the wireless communication I/F 67 are connected to each other so as to be communicable with each other via an internal bus 68.

The CPU 61 is a central processing unit that executes various programs and that controls various units. That is, the CPU 61 reads the program from the ROM 62 or the storage unit 64 and executes the program using the RAM 63 as a work area. The CPU 61 controls each of the above configurations and performs various arithmetic processes in accordance with the program recorded in the ROM 62 or the storage unit 64.

The ROM 62 stores various programs and various data. The RAM 63 temporarily stores a program or data as a work area.

The storage unit 64 is composed of a storage device such as an embedded Multi-Media Card (cMMC) or a universal flash storage (UFS), and stores various programs and various data.

The in-vehicle communication I/F 65 is an interface for connecting to the ECUs 70. For the interface, a communication standard based on a controller area network (CAN) protocol is used. The in-vehicle communication I/F 65 is connected to an external bus 89.

The ECUs 70 are provided for respective functions of the vehicle 60, and in the first embodiment, an ECU 70A, an ECU 70B, the ECU 70C, and an ECU 70D are provided. The ECU 70A is exemplified by an electric power steering ECU, and the steering angle sensor 71 is connected to the ECU 70A. The ECU 70B is exemplified by a vehicle stability control (VSC) ECU, and the acceleration sensor 72 and the vehicle speed sensor 73 are connected to the ECU 70B. In addition to the acceleration sensor 72 and the vehicle speed sensor 73, a yaw rate sensor may be connected to the ECU 70B.

The ECU 70C is exemplified by an engine ECU, and detects the engine speed and the engine torque of the vehicle 60 to control the engine. The ECU 70C detects the fuel consumption based on a fuel flow rate acquired from sensors (not shown). Further, the ECU 70C detects the accelerator operation of the vehicle 60. The engine speed, the engine torque, the fuel consumption, and the accelerator operation detected by the ECU 70C are stored in the storage unit 64 and transmitted to the management server 20 as the vehicle information. The ECU 70D is exemplified by a steering ECU, and the turn signal switch 74 is connected to the ECU 70D. The turn signal switch 74 is provided on the steering column for operating the turn signal. The ECU 70D detects the operation of the turn signal switch 74 by the driver as the turn signal operation. The turn signal operation detected by the ECU 70D is stored in the storage unit 64 and transmitted to the management server 20 as the vehicle information.

The steering angle sensor 71 is a sensor for detecting the steering angle of the steering wheel. The steering angle detected by the steering angle sensor 71 is stored in the storage unit 64 and transmitted to the management server 20 as the vehicle information.

The acceleration sensor 72 is a sensor for detecting the acceleration acting on the vehicle 60. The acceleration sensor 72 is, for example, a three-axis acceleration sensor that detects the acceleration applied in the vehicle front-rear direction as the X-axis direction, the vehicle width direction as the Y-axis direction, and the vehicle height direction as the Z-axis direction. The acceleration detected by the acceleration sensor 72 is stored in the storage unit 64 and transmitted to the management server 20 as the vehicle information.

The vehicle speed sensor 73 is a sensor for detecting a vehicle speed of the vehicle 60. The vehicle speed sensor 73 is, for example, a sensor provided on a vehicle wheel. The vehicle speed detected by the vehicle speed sensor 73 is stored in the storage unit 64 and transmitted to the management server 20 as the vehicle information.

The input and output I/F 66 is an interface for communicating with the microphone 75, the camera 76, the input switch 77, the monitor 78, the speaker 79, and the GPS device 80 mounted on the vehicle 60.

The microphone 75 is a device provided on the front pillar, the dashboard, or the like of the vehicle 60, and collects voices emitted by the driver of the vehicle 60. The microphone 75 may be provided in the camera 76 that will be described later.

The camera 76 is, for example, an imaging device that performs imaging using an imaging element such as a charge coupled device (CCD) image sensor or a complementary metal oxide semiconductor (CMOS) image sensor. The camera 76 is provided, for example, at the front portion and the rear portion of the vehicle 60 and captures an image of the front and the rear of the vehicle 60. The image captured by the camera 76 is used, for example, to recognize other vehicles, pedestrians, walls, lanes, etc. in front of the vehicle and other vehicles, walls, etc. behind the vehicle. The image captured by the camera 76 is stored in the storage unit 64 and transmitted to the management server 20 as the vehicle information. Note that the camera 76 may be configured as an imaging device for other uses such as a drive recorder and an advanced driver assistance system (ADAS). Further, the camera 76 may be connected to the on-board device 15 via the ECU 70 (for example, a camera ECU).

The input switch 77 is provided on the instrument panel, the center console, the steering wheel, or the like, and is a switch for inputting an operation by fingers of the driver. As the input switch 77, for example, a push button type numeric keypad, a touch pad, or the like can be adopted.

The monitor 78 is a liquid crystal monitor provided on an instrument panel, an instrument cluster, or the like, for displaying an image of an operation proposal related to a function of the vehicle 60 and an explanation of the function. The monitor 78 may be provided as a touch panel that also serves as the input switch 77.

The speaker 79 is a device provided on an instrument panel, a center console, a front pillar, a dashboard, or the like, for outputting a voice for an operation proposal related to a function of the vehicle 60 and an explanation of the function. The speaker 79 may be provided on the monitor 78.

The GPS device 80 is a device that measures the current position of the vehicle 60. The GPS device 80 includes an antenna (not shown) that receives signals from GPS satellites. The current position of the vehicle 60 that is measured by the GPS device 80 is stored in the storage unit 64 and transmitted to the management server 20 as the vehicle information. Note that, the GPS device 80 may be connected to the on-board device 15 via a car navigation system connected to the ECU 70 (for example, a multimedia ECU).

The wireless communication I/F 67 is a wireless communication module for communicating with the management server 20. For the wireless communication module, for example, communication standards such as 5G, long term evolution (LTE), and Wi-Fi (registered trademark) are used. The wireless communication I/F 67 is connected to the network N.

FIG. 6 is a flowchart showing the flow of a notification process for notifying the driver of the vehicle 60 of the notification information from the management server 20. The notification process is executed when the CPU 21 reads the information processing program 24A from the storage unit 24, expands the information processing program 24A into the RAM 23, and executes the program.

In step S10 shown in FIG. 6, the CPU 21 acquires the vehicle information from the vehicle 60. Then, the process proceeds to step S11. In the first embodiment, as an example, the vehicle information is periodically transmitted from the vehicle 60 to the management server 20.

In step S11, the CPU 21 performs the driving diagnosis of the driver based on the vehicle information acquired in step S10. Then, the process proceeds to step S12.

In step S12, the CPU 21 generates the notification information to be notified to the driver of the vehicle 60.

Specifically, the CPU 21 generates the diagnosis information to be included in the notification information, based on the driving diagnosis result of the driver in the driving diagnosis performed in step S11. When the specific information is acquired in step S10, the CPU 21 generates the execution information and the position information to be included in the notification information in addition to the diagnosis information described above. Further, when the predetermined notification opportunity arrives, the CPU 21 generates at least one of the number of times information and the category information to be included in the notification information in addition to the diagnosis information, the execution information, and the position information described above. Then, the process proceeds to step S13.

In step S13, the CPU 21 transmits the notification information generated in step S12 to the driver terminal 40. Then, the notification process ends.

Next, a display example displayed on the display unit 46 of the driver terminal 40 as a result of the notification process shown in FIG. 6 being performed by the management server 20 will be described.

FIG. 7 shows a first display example displayed on the display unit 46 of the driver terminal 40. The CPU 21 of the management server 20 causes the display unit 46 to display the display example shown in FIG. 7 when an application that is installed in the driver terminal 40 and indicates the driving diagnosis result of the driver (hereinafter referred to as a "driving diagnosis app") is executed and a predetermined operation is performed on the driving diagnosis app.

In the display example shown in FIG. 7, a message information 81, a next button 82, and an end button 83 are displayed. Note that the message information 81 is content displayed based on the notification information transmitted from the management server 20.

The message information 81 indicates various messages to the driver. As an example in FIG. 7, "<Comprehensive evaluation>General item A: 4/5 points, General item B: 3/5 points, . . . . Specific item A: 4/5 points, Specific item B: 2/5 points, . . . . Total: 75 points/100 points" is displayed as the message information 81. In this way, the message information 81 indicates the individual evaluation of each item of the general item and the specific item, and the total evaluation obtained by summing the individual evaluations of the general item and the specific item. Although specific item names are not shown in FIG. 7 and expressions such as General item A and Specific item A are used, the general item may be specifically indicated using expressions such as "ignoring traffic lights" and "violation of traffic divisions", and the specific item may be specifically indicated using expressions such as "collision damage mitigation brake device" and "sudden start suppression device for pedal misapplication".

The next button 82 is a button for switching the screen content of the driving diagnosis app displayed on the display unit 46. As an example, when the next button 82 is operated while the display example shown in FIG. 7 is being displayed, the CPU 21 switches the screen content of the driving diagnosis app displayed on the display unit 46 to the display example shown in FIG. 8.

The end button 83 is a button for ending the driving diagnosis app and switching the screen content displayed on the display unit 46 to a screen content other than the driving diagnosis app.

FIG. 8 shows a second display example displayed on the display unit 46 of the driver terminal 40. As an example, FIG. 8 shows a state after the next button 82 is operated while the display example shown in FIG. 7 is being displayed.

In the display example shown in FIG. 8, the message information 81, the next button 82, and the end button 83 are displayed.

As an example, in FIG. 8, "<Individual evaluation>This time, Specific item B was 3 points or lower. Sudden start suppression device for pedal misapplication would have been executed in parking lot of ABC supermarket if support car had been driven. Finally, the number of times advanced safety technology would have been executed per week if support car had been driven is "5 times"." is displayed as the message information 81. Thus, the message information 81 indicates the individual evaluation of the specific item. Specifically, the message information 81 indicates, as the individual evaluation, the fact that the specific item is equal to or lower than a predetermined standard (for example, 3 points), that the advanced safety technology would have been executed if the support car had been driven and the position where the advanced safety technology would have been executed, and the number of times the advanced safety technology would have been executed if the support car had been driven per unit time (for example, the last week).

Here, as an example, when the next button 82 is operated while the display example shown in FIG. 8 is being displayed, the CPU 21 switches the screen content of the driving diagnosis app displayed on the display unit 46 to the display example shown in FIG. 9.

FIG. 9 shows a third display example displayed on the display unit 46 of the driver terminal 40. As an example, FIG. 9 shows a state after the next button 82 is operated while the display example shown in FIG. 8 is being displayed.

In the display example shown in FIG. 9, the message information 81, the next button 82, and the end button 83 are displayed.

As an example, in FIG. 9, "<Category information>Recommended vehicle type of support car for you is SUV." is displayed as the message information 81. Thus, the message information 81 indicates the category of the support car that is suitable for the driver.

As described above, in the management server 20, the CPU 21 acquires the vehicle information. Further, the CPU 21 performs the driving diagnosis of the driver of the vehicle 60 based on the acquired vehicle information and the evaluation item including the specific item. Then, the CPU 21 notifies the driver of the result of the evaluation of the specific item of the driver, that is, the individual evaluation of the specific item. As an example, when the CPU 21 evaluates that the individual evaluation of the specific item of the driver is equal to or lower than a predetermined standard, the CPU 21 notifies the driver that the individual evaluation of the specific item is equal to or lower than the predetermined standard. As a result, the management server 20 notifies the driver that the individual evaluation of the specific item related to the advanced safety technology that can be executed by the support car is equal to or lower than the predetermined standard, making it possible to provide the driver with determination material on whether it is better to drive the support car.

Further, in the management server 20, when the specific information is acquired, the CPU 21 notifies the driver that the advanced safety technology would have been executed if the support car had been driven. As a result, the management server 20 notifies the driver that the advanced safety technology would have been executed if the support car had been driven, thereby making it easier for the driver to determine whether it is better to drive the support car.

Also, in the management server 20, the CPU 21 notifies the driver of the number of times the advanced safety technology would have been executed if the support car had been driven, based on the acquired specific information. As a result, the management server 20 notifies the driver of the number of times the advanced safety technology would have been executed if the support car had been driven, thereby making it easier for the driver to determine whether it is better to drive the support car.

In the management server 20, the CPU 21 notifies the driver after the vehicle 60 is driven. As a result, the management server 20 notifies the driver after the vehicle 60 is driven, so that the driver can carefully consider the notification content.

Further, in the management server 20, when the specific information is acquired, the CPU 21 notifies the driver of the position information indicating the position where the advanced safety technology would have been executed if the support car had been driven. As a result, the management server 20 notifies the driver of the position information indicating the position where the advanced safety technology would have been executed if the support car had been driven, thereby allowing the driver to grasp the position where the advanced safety technology would have been executed.

Also, in the management server 20, the CPU 21 notifies the driver of the category information indicating the category of the support car that is suitable for the driver based on the driving diagnosis result of the driver. As a result, the management server 20 notifies the driver of the category information indicating the category of the support car that is suitable for the driver, thereby allowing the driver to grasp the category of the support car that is suitable for him/herself.

Second Embodiment

Next, a second embodiment of the information processing system 10 according to the present embodiment will be described while omitting or simplifying the overlapping portion with the other embodiments.

In the second embodiment, the notification unit 21C notifies the driver while the vehicle 60 is being driven. The notification unit 21C transmits the notification information to the vehicle 60 when a predetermined notification opportunity arrives, based on the fact that the acquisition unit 21A acquires, as the vehicle information, that the ignition switch of the vehicle 60 is in the ON position while the vehicle 60 is being driven. The vehicle 60 that has acquired the notification information causes the monitor 78, more specifically, a multi-information display (hereinafter referred to as "MID") 78A to display content based on the notification information.

For example, when the evaluation unit 21B evaluates that the individual evaluation of the specific item of the driver is equal to or lower than a predetermined standard, the notification unit 21C transmits to the vehicle 60 the notification information including the diagnosis information indicating that the individual evaluation of the specific item is equal to or lower than the predetermined standard, based on the fact that the ignition switch is switched from the OFF position to the ON position.

Further, when the acquisition unit 21A acquires the specific information, the notification unit 21C transmits to the vehicle 60 the notification information including the execution information in addition to the diagnosis information.

Figure 10:
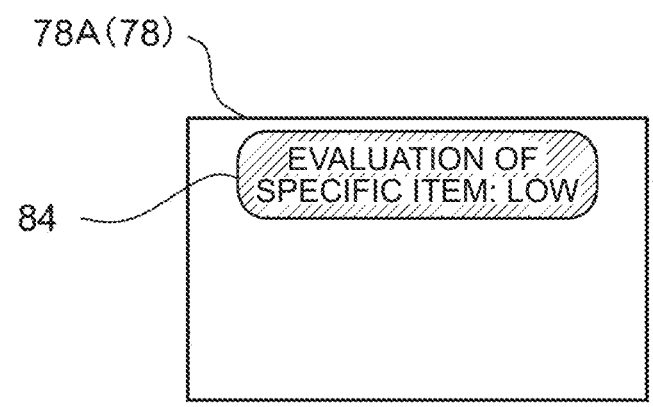
FIG. 10 is a first display example displayed on a multi-information display (MID) while the vehicle is being driven according to the present embodiment.

FIG. 10 is a first display example displayed on the MID 78A while the vehicle 60 is being driven.

As shown in FIG. 10, diagnosis information 84 is displayed on the MID 78A.

The diagnosis information 84 indicates the result of the individual evaluation of the specific item for the driver. As an example, in FIG. 10, "Evaluation of specific item: low" is displayed as the diagnosis information 84, indicating to the driver that the individual evaluation of the specific item is equal to or lower than a predetermined standard.

Figure 11:
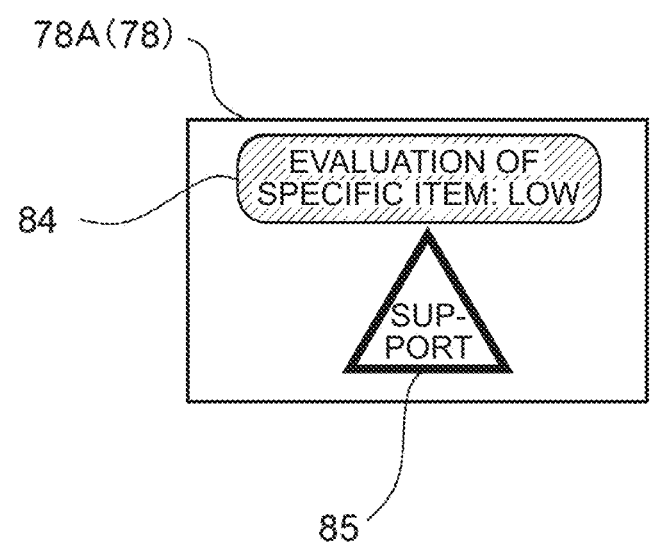
FIG. 11 is a second display example displayed on the MID while the vehicle is being driven according to the present embodiment.

FIG. 11 is a second display example displayed on the MID 78A while the vehicle 60 is being driven.

Here, it is assumed that the CPU 21 acquires the specific information while the vehicle 60 is being driven. In this case, the CPU 21 transmits the notification information including the execution information to the vehicle 60. As a result, the diagnosis information 84 and execution information 85 are displayed on the MID 78A of the vehicle 60 that has acquired the notification information, as shown in FIG. 11.

The execution information 85 indicates to the driver that the advanced safety technology would have been executed if the support car had been driven. As an example, in FIG. 11, an icon in which characters "Support" are displayed in a figure of a "A (triangle)" is displayed as the execution information 85.

The display content of the diagnosis information 84 is not limited to the content that the individual evaluation of the specific item is equal to or lower than a predetermined standard, and may be other content such as content that the individual evaluation of the specific item exceeds the predetermined standard. In addition, the icon displayed in the execution information 85 is not limited to the one in which the character "Support" is displayed in the figure of a "A (triangle)", and a different icon may indicate that the advanced safety technology would have been executed if the support car had been driven.

As described above, in the management server 20, the CPU 21 notifies the driver while the vehicle 60 is being driven. As a result, in the management server 20, the notification to the driver, for example, the notification that the individual evaluation of the specific item is equal to or lower than a predetermined standard, that the advanced safety technology would have been executed if the support car had been driven, and the like is executed while the vehicle 60 is being driven, thereby allowing the driver to easily grasp whether it is better to drive the support car while driving the vehicle 60.

Others

In the above-described embodiments, the management server 20 is used an example of the information processing device. However, the present disclosure is not limited to this, and the on-board device 15 mounted on the vehicle 60 may be used as an example of the information processing device, and a combination of the management server 20 and the on-board device 15 may be used as an example of the information processing device. When the combination of the management server 20 and the on-board device 15 is used as an example of the information processing device, at least part of each functional configuration of the CPU 21 of the management server 20 shown in FIG. 4 may be performed by the CPU 61 of the on-board device 15 shown in FIG. 5. In this case, the notification process shown in FIG. 6 is executed by one processor of the CPU 21 of the management server 20 or the CPU 61 of the on-board device 15, or by a combination of multiple processors of the CPU 21 of the management server 20 and the CPU 61 of the on-board device 15.

In the above-described embodiments, the management server 20 transmits the notification information to the driver terminal 40 after the vehicle 60 is driven. However, the transmission destination of the notification information is not limited to the driver terminal 40. For example, the management server 20 may transmit the notification information to a predetermined printer after the vehicle 60 is driven so that the content based on the notification information can be printed on a recording medium such as paper.

In the above-described embodiments, the position information indicating the position where the advanced safety technology would have been executed if the support car had been driven is indicated by a "place name" (see FIG. 8). However, the present disclosure is not limited to this, and the position information may be indicated by an "address", a "map", and the like.

Although the vehicle 60 is not a support car in the above-described embodiments, the present disclosure is not limited to this, and the vehicle 60 may be a support car. In this case, the information processing system 10 can provide the driver with determination material on whether it is better to change the vehicle 60, which is a support car, to another support car.

In the above-described embodiments, when the CPU 21 of the management server 20 evaluates that the individual evaluation of the specific item of the driver is equal to or lower than the predetermined standard, the CPU 21 generates, as the driving diagnosis result, the diagnosis information indicating that the individual evaluation of the specific item is equal to or lower than the predetermined standard, in addition to the individual evaluation of each item of the evaluation item and the total evaluation. However, instead of this or in addition to this, when the CPU 21 evaluates that the individual evaluation of the specific item of the driver exceeds the predetermined standard, the CPU 21 may generate, as the driving diagnosis result, the diagnosis information indicating that the individual evaluation of the specific item exceeds the predetermined standard, in addition to the individual evaluation of each item of the evaluation item and the total evaluation. In this case, the management server 20 notifies the driver that the individual evaluation of the specific item related to the advanced safety technology that can be executed by the support car exceeds the predetermined standard, making it possible to provide the driver with determination material on whether it is better to drive the support car.

In the above-described embodiments, the vehicle 60 that has acquired the notification information causes the MID 78A of the monitor 78 to display the content based on the notification information. However, the present disclosure is not limited to this, and the vehicle 60 may cause another monitor 78 such as a head-up display to display the content based on the notification information. Further, the vehicle 60 that has acquired the notification information may output a voice based on the notification information from the speaker 79 instead of or in addition to displaying the content based on the notification information on the monitor 78.

In the above-described embodiments, the management server 20 transmits the notification information to the vehicle 60 while the vehicle 60 is being driven. However, the transmission destination of the notification information is not limited to the vehicle 60. For example, the management server 20 may transmit the notification information to the driver terminal 40 while the vehicle 60 is being driven to cause the display unit 46 of the driver terminal 40 to display the content based on the notification information, or to cause a speaker (not shown) of the driver terminal 40 to output a voice based on the notification information.

In the above-described embodiments, the driver of the vehicle 60 is an elderly driver aged 75 or over. However, the present disclosure is not limited to this, and the driver of the vehicle 60 may be a driver who rarely drives with a driving experience of less than a predetermined period, an expert driver with a driving experience of a predetermined period or more, or the like.

In the above-described embodiments, when the CPU 21 of the management server 20 notifies the driver of the notification information including the category information, the CPU 21 may notify the driver of campaign information related to the category of the support car indicated by the category information. As a result, the driver can grasp, as the campaign information, discount information, privilege information, and the like for the category of the support car indicated by the category information, so that the driver's motivation to purchase the support car can be increased.

It should be noted that various processors other than the CPU may execute the notification process that is executed when the CPU 21 reads the software (program) in the above embodiments. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. Further, the notification process may be executed by one of these various processors, or a combination of two or more processors of the same type or different types (for example, a combination of multiple FPGAs, a combination of a CPU and an FPGA, and the like). The hardware structure of each of the various processors is, more specifically, an electric circuit in which circuit elements such as semiconductor elements are combined.

Further, in the above-described embodiments, the mode in which the information processing program 24A is stored (installed) in the storage unit 24 in advance has been described, but the present disclosure is not limited to this. The information processing program 24A may be stored in a storage medium such as a compact disc read-only memory (CD-ROM), a digital versatile disc read-only memory (DVD-ROM), and a universal serial bus (USB) memory to be provided. Further, the information processing program 24A may be downloaded from an external device via the network N.

What is claimed is:

1. An information processing device comprising:
    a computer configured to:
    acquire, offboard via wireless communication, vehicle information related to a vehicle;
    perform evaluation related to driving of a driver of the vehicle for an evaluation item including a specific item related to a function that assists driving and that is executable by a specific vehicle different from the vehicle, based on the vehicle information acquired by the computer;
    compare an evaluation result of the specific item of the driver between the vehicle and the specific vehicle,
    notify, via a display, the driver of evaluation result of the specific item of the driver by the computer, and
    display, via the display to the driver, a number of times the function would have been executed if the specific vehicle had been driven, based on the specific information acquired by the computer.

2. The information processing device according to claim 1, wherein the computer notifies the driver that the function would have been executed if the specific vehicle had been driven, when the computer acquires specific information that is specific vehicle information.

3. The information processing device according to claim 1, wherein the computer notifies the driver after the vehicle is driven.

4. The information processing device according to claim 3, wherein the computer notifies the driver of position information indicating a position where the function would have been executed if the specific vehicle had been driven, when the computer acquires the specific information that is specific vehicle information.

5. The information processing device according to claim 3, wherein the computer notifies the driver of category information indicating a category of the specific vehicle that is appropriate for the driver, based on the evaluation result of driving of the driver by the computer.

6. The information processing device according to claim 1, wherein the computer notifies the driver while the vehicle is being driven.

7. An information processing method in which a computer executes processes comprising:
   acquiring offboard via wireless communication, vehicle information related to a vehicle;
   performing evaluation related to driving of a driver of the vehicle for an evaluation item including a specific item related to a function that assists driving and that is executable by a specific vehicle different from the vehicle, based on the acquired vehicle information;
   comparing an evaluation result of the specific item of the driver between the vehicle and the specific vehicle,
   notifying, via a display, the driver of evaluation result of the specific item of the driver, and
   displaying, via the display, to the driver a number of times the function would have been executed if the specific vehicle had been driven, based on the specific information acquired by the computer.

8. A non-transitory storage medium storing instructions that cause a computer to execute processes comprising:
   acquiring, offboard via wireless communication, vehicle information related to a vehicle;
   performing evaluation related to driving of a driver of the vehicle for an evaluation item including a specific item related to a function that assists driving and that is executable by a specific vehicle different from the vehicle, based on the acquired vehicle information;
   comparing an evaluation result of the specific item of the driver between the vehicle and the specific vehicle,
   notifying, via a display, the driver of evaluation result of the specific item of the driver, and
   displaying, via the display, to the driver a number of times the function would have been executed if the specific vehicle had been driven, based on the specific information acquired by the computer.

\* \* \* \* \*